Figures 1, 2:
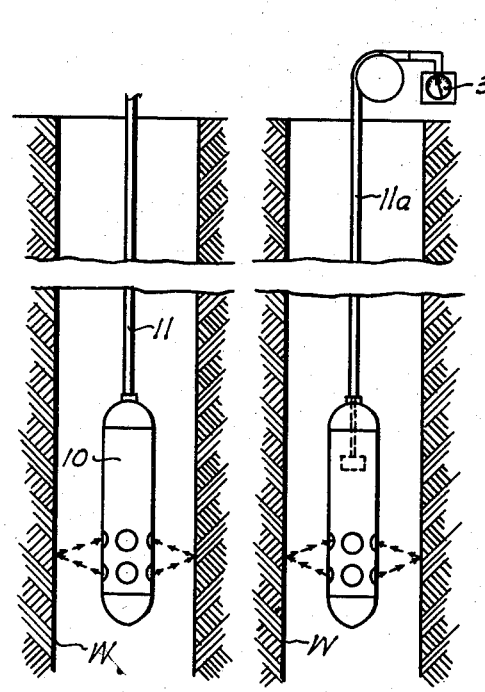

May 6, 1952   R. W. GOBLE ET AL   2,596,023
AUDIO CALIPER DEVICE
Filed Dec. 16, 1944   3 Sheets—Sheet 1

Gordon Jackson
Ralph W. Goble
INVENTORS

BY Joe E. Edwards
ATTORNEYS

May 6, 1952  R. W. GOBLE ET AL  2,596,023
AUDIO CALIPER DEVICE
Filed Dec. 16, 1944  3 Sheets-Sheet 2
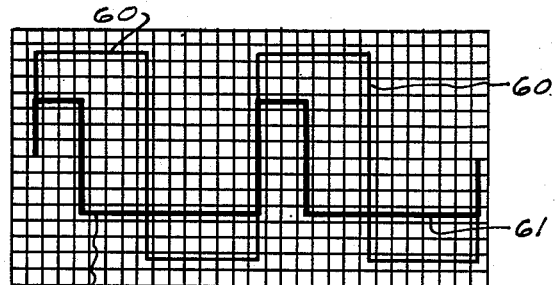
Fig. 8
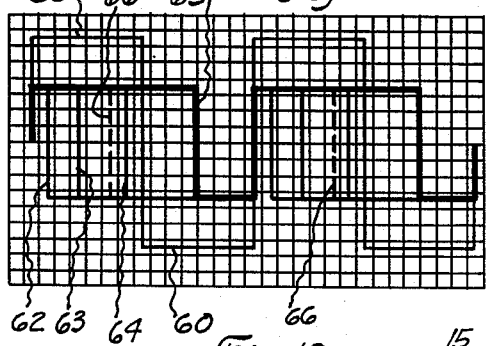
Fig. 10
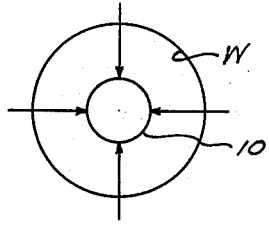
Fig. 9
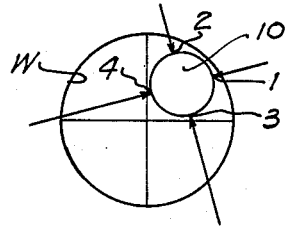
Fig. 11
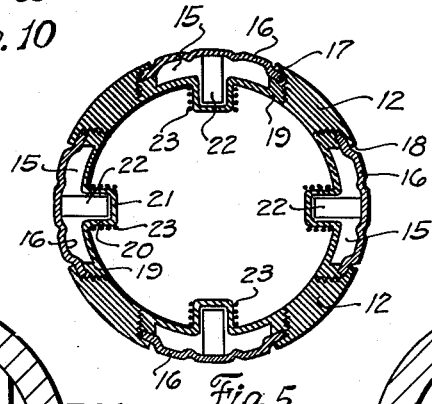
Fig. 5
Fig. 6
Fig. 12
Gordon Jackson
Ralph W. Goble
INVENTORS
BY *Jod E. Edwards*
ATTORNEY Patented May 6, 1952

2,596,023

UNITED STATES PATENT OFFICE 2,596,023

AUDIO CALIPER DEVICE

Ralph W. Goble, Denver, Colo., and Gordon Jackson, Long Beach, Calif., assignors, by direct and mesne assignments, to Eastman Oil Well Survey Company, Dallas, Tex., and Denver, Colo., a corporation of Delaware Application December 16, 1944, Serial No. 568,542

13 Claims. (Cl. 181—0.5)

This invention relates to new and useful improvements in caliper devices.

One object of the invention is to provide an improved caliper device which is adapted to be lowered within a bore for determining the variations in the cross section thereof and being particularly adapted for use in a well bore to measure the diameter of said bore, said device being simple in construction and eliminating mechanical measuring elements or expanding arms together with their inherent disadvantages.

An important object of the invention is to provide an improved caliper for determining the size and shape of a well or other bore which device is arranged to provide a continuous measurement and indication of the cross-sectional area of the bore as said caliper traverses said bore; the device being constructed so that the indication given thereby may be permanently recorded by means within said device or a visual indicating means may be actuated at the surface of the bore whereby an immediate indication of the measurement is given at the surface and while the device is within said bore.

A particular object of the invention is to provide an improved caliper device which is arranged to traverse a well bore and which has means for generating and transmitting sound waves radially outwardly therefrom, together with receiving or pick-up means also incorporated in the instrument for receiving the transmitted sound waves after said waves have been reflected from the well bore, whereby a comparison between the transmitted and received waves is indicative of the distance travelled by said waves and is thereby representative of the diameter of the bore at the point of transmission and reception.

Another object of the invention is to provide an improved caliper device wherein sound waves are transmitted and directed radially outwardly into contact with the wall of the well bore, said waves being reflected from the wall and received by a receiving means, together with improved measuring means for accurately measuring the time lapse between the instant of transmission and the instant of reception; said time lapse being representative of the distance travelled by said sound waves to indicate the diameter of the well bore and the variations or changes in such time lapses as the device traverses the well bore being a measure of the diametric variations in the bore hole.

Still another object of the invention is to provide an improved caliper device, of the character described, wherein the transmission of sound waves occurs simultaneously at various stations spaced radially around the device and also wherein reception of said waves is effected also at spaced radial stations, whereby an accurate measurement of the time of travel and reflection of the sound waves from and to all stations may be accomplished so that regardless of the position of the device with respect to the axis of the well bore, an accurate indication of the bore diameter may be obtained.

A further object of the invention is to provide an improved caliper device having a plurality of transmission and receiving stations spaced radially therearound, together with improved means for integrating the indications of all stations to provide a single indication which is a mean constant of all indications, whereby said single indication furnishes accurate information as to the bore diameter irrespective of the position of the device with relation to the axis of said bore.

A still further object of the invention is to provide a caliper device, of the character described, wherein electrical mechanism is employed for generating the transmitted sound waves and for receiving said waves after reflection from the wall of the well bore, together with an electrically operated indicating means which may be mounted within the device or which may be located at the surface and electrically connected with said device as it is lowered or raised through the well bore.

Figure 3:
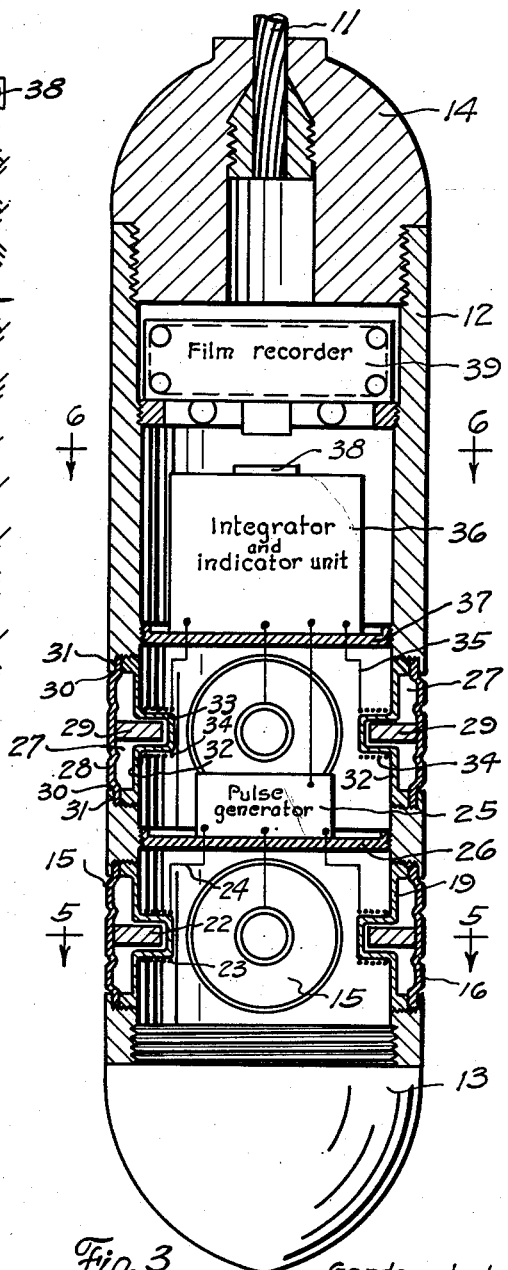
Figure 4:
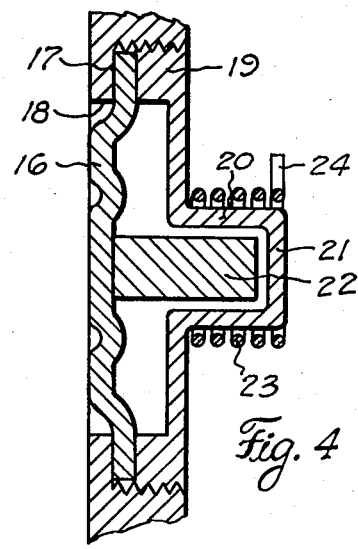
Figure 7:
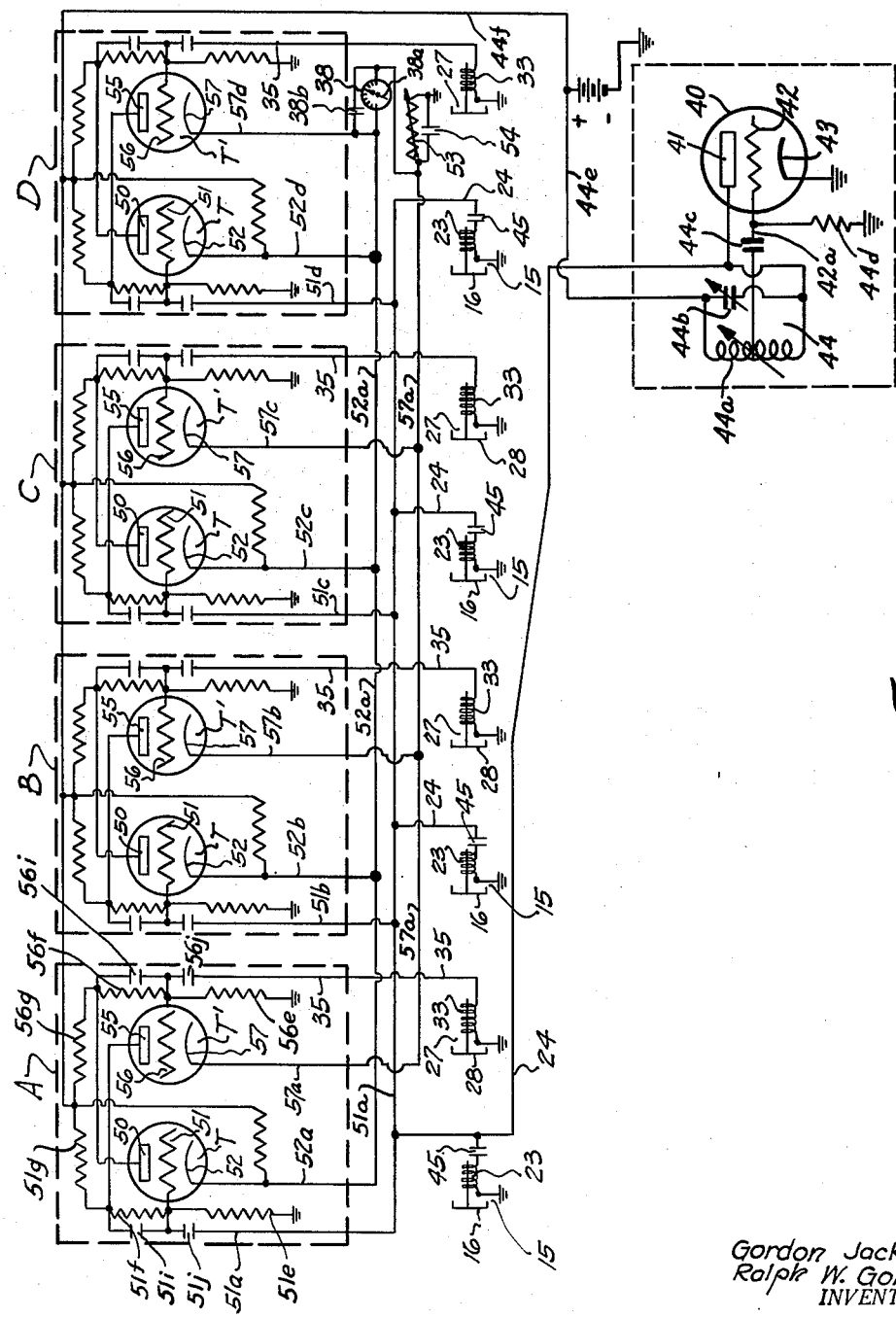

The construction designed to carry out the invention will be more readily understood from a reading of the following specification and by reference to the accompanying drawing, wherein an example of the invention is shown, and wherein:

Figure 1 is a view illustrating a caliper device, constructed in accordance with the invention, being lowered within a well bore on a wire line, Figure 2 is a similar view illustrating the device being lowered on a conductor cable, Figure 3 is an enlarged longitudinal, sectional view of the device, Figure 4 is an enlarged, sectional detail of one of the diaphragm assemblies, Figure 5 is a horizontal, cross-sectional view taken on the line 5—5 of Figure 3, Figure 6 is a horizontal, cross-sectional view taken on the line 6—6 of Figure 2, Figure 7 is a wiring diagram of the transmitting and receiving mechanism of the device, Figure 8 is a graph ilustrating the transmission and reception of sound waves when the device is located in axial alignment with the well bore, Figure 9 is a section illustrating the instrument positioned in axial alignment with the well bore, Figure 10 is a graph illustrating the reception and transmission of sound waves when the instrument is off center of the well bore, Figure 11 is a view similar to Figure 9 showing the instrument disposed nearer one side of the well bore, and, Figure 12 is a horizontal, cross-sectional view similar to Figure 6 and illustrating an individual meter for each receiving diaphragm and its circuit.

In the drawings the numeral 10 designates an instrument which is adapted to be lowered within a well bore W either on a wire line 11 (Figure 1) or conductor cable 11a (Figure 2) or by means of a well pipe in which said instrument may be connected. The instrument includes an elongate tubular housing or casing 12 which has its lower end closed by a bull plug 13 which is threaded into the lower end of the casing. The upper end of the casing is closed by a cable or wire line socket 14 and obviously the wire line or cable 11 may be connected thereto. It is, of course, understood that when the instrument is run by means of a well pipe, the plug 13 and socket 14 will be eliminated and the casing 12 connected in the well pipe by suitable couplings (not shown).

A sound transmitter is mounted within the lower portion of the casing 12 and includes a plurality of movable diaphragm assemblies 15 which are mounted in the wall of the casing and which are spaced equidistant at various stations or positions therearound. As illustrated, four diaphragms have been shown but any desired number may be employed. Each assembly 15 includes a flexible diaphragm 16 which has its peripheral portion engaging an annular shoulder 17, which shoulder is formed adjacent an opening 18 formed in the wall of the casing 12. A retaining element 19 is threaded into the opening 18 and has its inner end engaging the diaphragm to clamp the marginal portion of said diaphragm in position against the shoulder 17. The element 19 is formed with an inwardly extending tubular portion or sleeve 20 which is made integral with the element and the outer end of the tubular portion or sleeve is closed by an end plate 21. The element 19, sleeve 20 and closure 21 may all be made integral with each other and are preferably constructed of brass or similar material. The diaphragm 16 has a cylindrical actuating rod or "pole-piece" 22 which extends axially of and is movable within the tubular portion 20. When the pole-piece or rod 22 is reciprocated rapidly it will be obvious that the diaphragm is vibrated whereby a sound wave is generated and transmitted outwardly from the diaphragm 16. By operating all of the diaphragms 16 of the transmitter simultaneously it will be apparent that sound waves are generated outwardly in all directions from the instrument casing 10. These sound waves will travel radially outwardly from the casing 12 and will strike the wall of the well bore W and said wall will act to reflect the sound waves back toward the casing 12 of the instrument.

For simultaneously operating the diaphragms 16 of the various diaphragm assemblies 15, the inwardly projecting tubular portion 20 of the retaining element 19 of each assembly is surrounded by an energizing coil 23 and each coil is connected through a wire 24 with a pulse generator 25. When the pulse generator is actuated, the coils 23 are energized and the actuating rods or pole-pieces 22 of the various diaphragms are rapidly reciprocated to impart vibration to the flexible diaphragms 16 and thereby generate the sound waves. The generator is constructed to generate spaced impulses at predetermined time intervals whereby the sound waves are transmitted at known time intervals. The pulse generator is supported within the interior of the casing 12 upon a suitable transversely extending supporting plate 26 which may be threaded or otherwise suitably secured within the bore of the casing.

It is preferable that the transmitted sound waves are of a high frequency and within the ultra-audible or supersonic range. The higher frequency range involves shorter wave lengths and therefore makes it possible to measure small distances less than one foot, such as are encountered in well bores, more accurately. However, the invention may be practiced with sonic waves over a wide range of frequencies in the higher level.

The sound waves which are generated by the diaphragms 16 and which travel outwardly into contact with the wall of the well bore W are reflected back toward the instrument and are received by a plurality of receiving or pick-up diaphragm assemblies 27 which are also located at various stations around the instrument casing. The receiving assemblies 27 are constructed in substantially the same manner as the transmitting assemblies 15, being mounted within the wall of the casing 12 and being disposed at various spaced points around said casing. Each receiving assembly 27 includes a flexible diaphragm 28 having an inwardly extending actuating rod or pole-piece 29. The diaphragm 28 is disposed within an opening 30 with its marginal portion abutting a shoulder 31 and being held in position against such shoulder by a retaining element 32. The retaining element 32 has an inwardly projecting tubular portion or sleeve 33 which has its end closed and the tubular portion is preferably made integral with the retaining element 32.

The reflected sound waves will obviously strike the receiving diaphragms 28 and will cause a vibration of said diaphragms; such vibration will result in a reciprocation of the actuating rods or pieces 29 of said diaphragms within the tubular portion 33 of each diaphragm assembly and this reciprocation of each rod or piece 29 is utilized to affect the operation of an electric coil 34 which surrounds the tubular portion 33 of each assembly. Each coil 34 is electrically connected through a wire 35 with an integrator and indicator unit 36. The unit 36 will be hereinafter described in detail in connection with the wiring diagram and is provided for the purposes of integrating the received current of all receiving coils 34 to provide a mean constant of said current. The integrator also functions to determine the exact time lapse between the time of transmission of the waves by the diaphragms 16 and the reception of such waves by the diaphragms 28. It is obvious that the time difference, when properly interpreted, will give an accurate indication as to the diameter of the well bore W for obviously in a well of smaller diameter the time lapse between transmission and reception of the sound waves will be less than the time lapse when the instrument is employed in a well of larger diameter because of the difference in actual travel of the sound waves. The integrator and indicator unit 36 is mounted upon a transverse support 37 within the casing 12 of the instrument and the unit includes a visible meter or indicator 38 which is mounted in the upper end of the unit and which provides a visual indication of the time lapse between transmission and reception. The meter 38 may be calibrated in inches to indicate the actual diameter of the well bore in which the instrument 10 is operated.

In order to obtain a record of the indications given by the meter 38 at various elevations within the well bore, a film recorder 39 may be mounted within the upper end of the casing 12. This film recorder may be of any suitable construction and may utilize ordinary movie film upon which the meter reading may be recorded. The film recorder is controlled by a suitable timing mechanism such as is now in general use in oil well survey instruments whereby a photograph of the meter 38 may be taken at predetermined fixed intervals as the instrument 10 is lowered through the well bore. The particular construction of the film recorder is subject to variation and any of the well known devices which are in use in the industry may be employed.

It is pointed out that it may be desirable to eliminate the film recorder and to connect the unit 36 to a surface meter by means of a conductor cable attached to the instrument, such arrangement being shown in Figure 2. In this instance the meter 38 is located at the surface and will have an electrical connection through a conductor cable 11a with the unit 36 within the casing 12, whereby a surface reading may be obtained at the time that the instrument 10 is being operated within the well bore.

From the foregoing it will be seen that the instrument may be lowered into the well bore and the pulse generator 25 may be operated either constantly or by a suitable timing mechanism which would actuate said generator at predetermined intervals. The necessary power is provided by dry cell batteries incorporated within the generator unit when a wire line or drill pipe is utilized to lower the device or is furnished from the surface through the conductor cable when said cable is used. When the pulse generator is actuated the diaphragms 16 of the transmitting assemblies 15 are actuated or vibrated to generate and transmit sound waves radially outwardly from the instrument. These sound waves travel outwardly until they strike the wall of the well bore W and are then reflected back toward the instrument where they are received by the pick-up or receiving diaphragms 28. The reception of the sound waves will result in a reciprocation of the actuating rods or pole-pieces 29 connected with said diaphragms and the rapid reciprocation of said rods or pieces will result in a current change in the coils 34 of the receiving assemblies. The current flowing from the coils to the integrator and indicator unit 36 will actuate said unit whereby an indication is given on the meter 38. This indication is representative of the time lapse between the transmission and reception of the waves and is therefore indicative of the actual diameter of the well bore at the time that the reading appears. As explained the film recorder 39 will record the various indications given by the meter 38 at various elevations so that when the unit is returned to the surface a permanent record of the diameter of the well bore may be had. It is noted that the power supply for the integrator and indicator unit 36 and for the film recorder may be in the form of dry cell batteries when the device is lowered on a wire line or drill pipe and may be furnished from the surface when a conductor cable is employed.

The construction of the pulse generator 25 as well as the integrator and indicator unit 36 is subject to some variation and a preferred form of an electrical hook-up for these units is illustrated in Figure 7.

By referring to the wiring diagram, it will be seen that the pulse generator 25 includes a pulse generator tube 40. The tube comprises the usual plate 41, grid 42 and cathode 43, the latter being suitably grounded. The grid 42 is connected by a wire 42a to the usual tuned circuit 44, which includes a variable inductance 44a and variable condenser 44b. A .004 microfarad condenser 44c is coupled in the connecting wire 42a and a 200,000 ohm resistance also has electrical connection with this wire. The plate 41 of said tube has connection through the wires 24 and common 51a with the energizing coils 23 of the transmitting diaphragm assemblies 15. The wire 44e extending from the tuned circuit 44 has connection with the positive side of the power source, and with the plates 50 and 55 of the tubes T, T' through wire 44f. A condenser 45 is connected in each wire 24. When the generator is actuated it will be apparent that the current flow through the tube 40 will result in energizing the coils 23 of the transmitting diaphragm assemblies 15 whereby all of the transmitting diaphragms 16 are actuated simultaneously to generate and transmit sound waves which travel radially outwardly from the instrument.

The integrator and indicator unit 36 includes a plurality of receiving or trigger circuits, each of which is associated with one of the receiving diaphragm assemblies 27. The receiving or trigger circuits are identified in the wiring diagram (Figure 7) by the letters A, B, C, and D and since each circuit operates in exactly the same manner it is believed that a description of one will suffice. Each circuit includes a pair of electronic tubes T and T' which are electrically connected together and which may be incorporated in a single physical tube, such as the usual or well known twin triode tube. The tube T includes a plate 50, grid 51 and cathode 52 and the grid of said tube is connected through a wire 51a with the wires 24 leading from the plate 41 of the pulse generator tube 40. Therefore, when the pulse generator tube is operated to actuate the transmitting diaphragms 16, as has been explained, the operation of the generator tube 40 functions to trigger the tube T, whereby a current flow through said tube may occur. The cathode 52 of the tube T is connected through a wire 52a with one side of the indicating meter 38 and since operation of the pulse generator tube causes a simultaneous current flow in the tube T of the receiving or trigger circuit, said current flow through tube T is indicated by the indicating needle 38a of the meter. A variable bias resistor 53, preferably of a value of 25,000 ohms having a by-pass condenser 54 preferably of a value of 1 microfared associated therewith is connected to the wire 51a while a condenser 38b (preferably .1 microfarad) is connected across the meter and acts to steady the indication given by the meter 38. The meter is preferably a 50 microamp. meter.

Each trigger circuit shown in Figure 7 illustrates various condensers and resistors associated with and forming part of the circuit. The values of these elements are subject to variation; however, certain values have been found satisfactory and as an example, these values will be hereinafter set forth although it is to be understood that the invention is not to be specifically limited thereto. As shown in Figure 7, resistances 51e, 51f and 51g have connection with the grid 51 of the tube T. The resistance 51e has a preferable value of 200,000 ohms, the resistance 51f has a value of 400,000 ohms and the third resistance has a value of 100,000 ohms. A fourth resistance 51h is connected in a wire which connects the wire 52a with the resistance 51g and this fourth resistance 51h has a preferable value of 100,000 ohms.

Adjacent the resistances 51e and 51f are condensers 51i and 51j which also have electrical connection with the grid 51 of the tube T. The condenser 51i preferably has a value of 25 micro-microfarads while the condenser 51j has a value of 50 micro-microfarads.

From the above it will be apparent that when the transmitting apparatus is actuated a current flow occurs in the tube T and this flow will continue until the wave generated by the transmitting apparatus has travelled outwardly to the wall of the well bore and is reflected back to the receiving diaphragm 28 which is associated with each receiving or trigger circuit. The second tube T' of the receiving circuit includes a plate 55, grid 56 and cathode 57. The grid of this tube is connected through the wire 35 with the coil 33 of one of the receiving diaphragm assemblies 27. The plate 55 of the tube T' is interconnected in the usual manner with the tube T while the cathode 57 is connected through the wire 57a with the other side of the meter 38, this latter connection being on the side opposite that to which the wire 52a leading from the cathode of the tube T is connected. With this arrangement the reception of the wave by the diaphragm 28 will trigger the second tube T' of the receiving circuit and when this occurs the flow of current through the first tube T will be shut off whereby the meter 38 will tend to move back toward a zero indication. The length of time between the transmission of the wave which is at the time that the pulse generator tube was actuated and the time that the wave is received after being reflected from the wall of the well bore will be indicated by the reading of the meter needle 38a. This time lapse when calibrated in inches will be representative of the distance which the wave had to travel and thus an accurate indication of the well diameter is provided. The meter 38 will, of course, be adjusted so as to compensate for the diameter of the instrument and therefore although the sound wave will travel only from the external surface of the instrument to the wall of the well and back again, the indication will be representative of the travel from the center of the instrument to the wall of the well.

Associated with the grid 56 of the second tube T' are a plurality of resistances 56e, 56f and 56g which are comparable to the resistances 51e, 51f and 51g, respectively, and which have the same values, that is, resistance 56e is of a value of 200,000 ohms, resistance 56f has a value of 400,000 ohms while resistance 56g is 100,000 ohms. Condensers 56i and 56j are electrically connected to the grid 56 and are of a value of 25 micro-microfarads and 50 micro-microfarads respectively.

As explained the receiving or trigger circuits are associated with the various receiving diaphragms 28 and each is connected to its diaphragm in the same manner as hereinbefore described with reference to the circuit A. The receiving circuits are connected in series and as illustrated, the tubes T of the circuits B, C, and D are connected through wires 51b, 51c and 51d with the wire 51a which connects to the pulse generator tube through the wires 24; in this manner the tubes T of all receiving circuits are triggered simultaneously and at the time that the transmitting diaphragms 16 are actuated. The cathodes of the tubes T of these circuits are connected through wires 52b, 52c and 52d with the common wire 52a which is connected to one side of the meter 38, whereby the time of operation of these tubes is indicated by said meter. The tubes T' of the circuits B, C, and D are connected by wires 35 with their receiving diaphragms 28, while the cathodes of these tubes are connected through wires 57b, 57c and 57d with the wire 57a which leads to the other side of the meter 38.

With all of the receiving circuits connected in series it will be apparent that when the transmitter is first operated all of the tubes T of the circuits A, B, C, and D will be triggered and a current flow will occur so that the meter will give a reading which will be the aggregate of the current flow in all of these tubes. As the receiving diaphragm 28 of the circuit A receives a reflected wave it will trigger the tube T' of the circuit A and will shut off flow through the tube T of that circuit and this halting of flow through said tube T of circuit A will be reflected by the meter 38. If all of the receiving diaphragms 28 receive sound waves simultaneously then the tubes T' of all four circuits A, B, C, and D will be triggered simultaneously to shut off the flow in the tubes T of said circuits. However, because the instrument 10 will very seldom be exactly centered within the well bore all of the diaphragms 28 will not receive reflected waves at exactly the same instant and therefore one or the other of the receiving circuits will have the flow through its tube T shut off first; very likely the various receiving circuits will be affected successively at various intervals in accordance with the particular position of the instrument within the well bore. By connecting all of the circuits in series and providing a single indicating meter 38, the mean constant of all circuits is indicated and therefore it makes no difference in what position the instrument may be within the well bore because the meter is merely indicating the average time lapse between transmission and reception of the sound waves sent and received by all of the transmitting and receiving diaphragms.

To more clearly illustrate the accurate indication irrespective of the axial position of the instrument within a well bore attention is directed to Figures 8 to 11. Figure 8 is an illustration of the transmitting and receiving wave when the instrument is axially aligned within a well bore as shown in Figure 9. The wave is shown as a square wave in order to make a clearer illustration and the line 60 represents the transmited wave which is, of course, of a predetermined time. The time lapse between the transmitted waves must be sufficient to assure that the waves will be received by the receivers before the next or subsequent time wave is generated. The line 60 which represents the transmitted waves is fixed and predetermined in accordance with the construction of the generator tube and the controlling mechanism. The four transmitting diaphragms will generate sound waves simultaneously and said waves will travel radially outwardly from the instrument from the various points or stations in which said diaphragms are located. With the instrument exactly in the center or in axial alignment with the well bore the four waves generated by the four transmitting diaphragms will travel outwardly the same distance and will be simultaneously reflected from the wall of the well bore so that all four waves will be received simultaneously by the four receiving diaphragms. Thus the received waves will all have exactly the same pattern so far as time lapse is concerned and the received waves are indicated by the single heavy line 61 in Figure 8.

However, when the instrument is disposed at one side of a well bore it is apparent that the transmitted waves sent out by four separate diaphragms will travel unequal distances and this is clearly evident from Figure 11 which shows the instrument at one side of the well bore. In this illustration two of the transmitting diaphragms are relatively close to the wall of the well bore and manifestly the waves generated by these diaphragms will travel much less distance than the waves generated by the other diaphragms. This will result in the receivers which are associated with the closer transmitting diaphragms being actuated in advance of the other receiving diaphragms. For the purpose of illustration the stations in which the four diaphragms are located have been numbered 1, 2, 3 and 4 with stations 1 and 2 closer to the well bore and stations 3 and 4 spaced a greater distance from the wall.

Referring to Figure 10 which shows the wave pattern, when the instrument is off center of the bore, the fixed line 60 is representative of the transmitted or generated waves and, of course, these waves are constant with respect to time. The transmitter and receiver of station 1 in Figure 11 are the closest to the wall and therefore the wave transmitted thereby will be the first to be received, this received wave being indicated by the line 62 in the graph of Figure 10. Station 2 of a transmitter and receiver is slightly further from the wall of the well and its wave will be received later in point of time than the wave sent and received by the diaphragms in station 1; the wave received by the diaphragm in station 2 is indicated by the line 63 in Figure 10. Line 64 in Figure 10 represents the wave received by the diaphragm in station 3 while line 65 represents the reception of the wave by the diaphragm in station 4. It is therefore apparent that when the instrument is disposed at one side of the well bore the transmitted waves are received by the various diaphragms at different intervals in point of time; however, since the receiving or trigger circuits A, B, C, and D, associated with each of the receiving diaphragms are connected in series and are all electrically connected to the single meter 38, the meter will indicate the mean constant of the time lapse which occurred between the transmission and reception, this constant being indicated by the dotted line 66 in Figure 10. In other words, the meter will indicate the average time lapse as determined by the reception of all diaphragms, whereby an accurate measurement of the diameter of the bore is made irrespective of the position of the instrument with relation to the center of said bore.

The operation of the device is obvious. When lowered by means of a wire line or by connection within the drill pipe or stem the film recorder is employed to photograph the meter as said meter registers the diameter of the well at various elevations within the bore. The power supply is by means of dry cell batteries incorporated within the pulse generator and within the integrator and indicator unit. The operation may be continuous so that the sound waves are generated outwardly and are received by the receiving diaphragms continuously throughout the lowering operation; if desired, the operation of the device may be intermittent so that measurements may be taken at any desired time and if intermittent operation is desired any of the usual timing mechanisms generally used in oil well survey instruments may be employed to control the action of the pulse generator. It is apparent that as the device is moved through the well bore the sound waves will be directed radially outwardly and will contact the wall of the bore. These waves will be received by the receiving diaphragms and the elapsed time between transmission and reception of the waves will be indicated by the meter 38. As explained, the time of travel of the waves is indicative of the well bore diameter and thus the different time variations are representative of the difference in the diameter of the well bore at various elevations.

When the device is lowered by means of a conductor cable, as shown in Figure 2, the film recorder is eliminated and power is supplied to the pulse generator and integrator unit from the surface. The meter 38 is instead of being located in the unit 36 is disposed at the surface and by continuously operating the pulse generator a continuous indication of the well diameter is had at the surface of the well. Of course, if desired, the device shown in Figure 2, may be operated intermittently at various elevations.

Although it is desirable to employ the single meter which indicates the mean constant or average time lapse as indicated by all receiving assemblies, it is not essential that such single meter be provided. The same result could be obtained by providing an individual meter 38' for each receiving circuit, as shown in Figure 12. In this instance it would be necessary to correlate the indications of the four meters in order to obtain the mean constant or average of the four indications. It is obvious that if each receiving circuit had its own meter, the distance which the wave received by each diaphragm had travelled would be individually indicated. Thus, the receiving diaphragms each located at a different station will provide a different indication and by correlating the indications of the four meters an average time lapse could be obtained. The provision of four meters would, of course, indicate the approximate position of the instrument with respect to the axis or center of the well bore. It is pointed out that when four meters are employed the receiving circuits A, B, C, and D are not connected in series with each other as shown in Figure 7 but each circuit is individually connected to its associated transmitter.

The device is relatively simple in construction and will accurately measure the diameter or cross-sectional area of a well bore. It is obvious that since said device includes no mechanical arms or expanding members that it is unlimited so far as measuring the diameter of exceptionally large well bores is concerned. In other words, it makes no difference what the diameter of the well may be, the device will still accurately measure such diameter.

The apparatus has been described as measuring the time lapse between the transmitted wave and the received wave in order to determine the diameter of the well bore. However, it is obvious that other measurements of the transmitted and received waves may be made to provide information as to the well bore diameter. For example, an oscillograph or phase meter may be connected with the transmitting and receiving diaphragms to measure the phase difference or angle between the transmitted wave and the received wave; such phase difference or angle will provide positive information as to the distance travelled by the transmitted wave whereby the diameter of the well bore at the point of the transmission and reception of the wave may be obtained. Another method of utilizing a comparison between the transmitted and received sound waves is to vary the audio modulation at an audio or predetermined rate and then measure the beat frequency between the transmitted pulse and the received pulse. The beat frequency would be indicative of the distance which the transmitted wave travelled from the transmitting diaphragm to the wall of the well bore and then reflected back to the receiving diaphragm and by such means the diameter of the bore may be determined.

Because of the fact that various measurements or comparisons of the transmitted and received waves may be made the invention is not to be restricted to any particular method of measurement and so long as the particular measurement yields information as to the distance travelled by the transmitted waves as they are radiated into contact with the well bore and then reflected back to the receiving diaphragms, the purposes of the invention will be accomplished.

The foregoing description of the invention is explanatory thereof and various changes in the size, shape and materials, as well as in the details of the illustrated construction may be made, within the scope of the appended claims, without departing from the spirit of the invention.

What we claim and desire to secure by Letters Patent is:

1. The method of measuring the cross-sectional area of a well bore which includes, lowering an instrument within the well bore, generating and simultaneously transmitting a plurality of series of energy impulses radially outwardly from a plurality of radial points spaced equidistantly around the instrument, each series being transmitted in a different radial direction within said well bore, whereby said impulses are directed outwardly against the wall of the well bore and are then reflected back to the instrument, receiving each series of the reflected impulses at radial points spaced to correspond with the impulse transmitters, taking measurements with respect to the instant of transmission of the transmitted series of impulses and the instant of reception of the received series of impulses at each radial point, and correlating all of the measurements taken to obtain information indicative of the distance travelled by said energy impulses.

2. The method as set forth in claim 1, with the further step of transposing the measurements into visual indications of the distance travelled by said energy impulses to indicate the diameter of the well bore at the point of transmission and reception.

3. The method of measuring the cross-sectional area of a well bore which includes, lowering an instrument within the well bore, electrically generating and simultaneously transmitting a plurality of series of energy impulses radially outwardly from a plurality of radial points spaced equidistantly around the instrument, each series being transmitted in a different radial direction within said well bore, whereby said impulses are directed outwardly against the wall of the well bore and are then reflected back to the instrument, receiving each series of the reflected impulses at radial points spaced to correspond with the impulse transmitters, taking measurements with respect to the instant of transmission of the transmitted series of impulses and the instant of reception of the received series of impulses at each radial point to obtain information indicative of the distance travelled by said energy impulses, and correlating all of the measurements taken to obtain information indicative of the mean constant of time lapse, whereby the diameter of the well bore may be ascertained.

4. The method of calipering the diameter of a well bore which includes, lowering an instrument within the well bore, generating and simultaneously transmitting energy impulses radially outwardly from a plurality of radial points spaced equidistantly around the instrument whereby said impulses are directed outwardly against the wall of the well bore and are then reflected back to the instrument, receiving the reflected impulses at the same radial points from which said impulses were transmitted, taking measurements with respect to the instant of transmission of the transmitted impulses and the instant of reception of the received impulses at each station to determine the time required for said impulses to return by reflection to the instrument, and correlating all of the measurments taken to indicate the distance travelled by said energy impulses to provide information as to the diameter of the well bore.

5. The method of calipering a well bore as set forth in claim 4, wherein the generation and transmission of said energy impulses as well as the measurement theerof is continuous, whereby a continuous determination of the well bore diameter may be made.

6. The method as set forth in claim 1 wherein the energy impulses are generated and transmitted and the measurements are taken continuously.

7. The method of calipering a well bore as set forth in claim 4, with the additional steps of continuously moving the instrument through the well bore so as to traverse the entire length thereof, and continuously generating and transmitting the energy impulses and taking the measurements thereof during such movement of said instrument.

8. The method of calipering a well bore which includes, lowering an instrument within the well bore, electrically generating and simultaneously transmitting a plurality of series of energy impulses radially outwardly from a plurality of radial points spaced equidistantly around the instrument, each series being transmitted in a different radial direction within said well bore, whereby said impulses are directed outwardly against the wall of the well bore and are then reflected back to the instrument, receiving each series of the reflected impulses at radial points spaced to correspond with the impulse transmitters, taking measurements with respect to the instant of transmission of the transmitted series of impulses and the instant of reception of the received series of impulses at each radial point to obtain information indicative of the distance travelled by said energy impulses, integrating the information indicative of the distance travelled by said energy impulses, and transposing said integrated measurements into visible indications representative of the well bore diameter at the point of measurement.

9. The method as set forth in claim 8, with the additional steps of continuously moving the instrument through the well bore so as to traverse the area thereof to be calipered, and continuously generating and transmitting energy impulses and taking measurements thereof to provide a continuous determination of the well bore diameter during movement of the instrument through said well bore.

10. The method of calipering a well bore which includes lowering an instrument within the well bore, generating and simultaneously transmitting energy impulses radially outwardly from a plurality of radial points spaced equidistantly around the instrument whereby said impulses are directed outwardly against the wall of the well bore and are then reflected back to the instrument, receiving the reflected impulses at the same radial points from which said impulses were transmitted, taking measurements with respect to the instant of transmission of the transmitted impulses and the instant of reception of the received impulses at each station to determine the distance travelled by said impulses, and correlating all of the measurements taken to indicate the well bore diameter, irrespective of the position of the instrument with relation to the axis of the well bore.

11. The method as set forth in claim 10, with the further step of transposing the correlated measurements into a visible indication of said well bore diameter.

12. The method as set forth in claim 10, with the additional steps of continuously moving the instrument through the well bore so as to traverse the area thereof to be calipered, and continuously generating and transmitting energy impulses and taking measurements thereof to provide a continuous determination of the well bore diameter during movement of the instrument through said well bore.

13. The method of calipering a well bore which includes lowering an instrument within the well bore, generating and simultaneously transmitting energy impulses radially outwardly from a plurality of radial points spaced equidistantly around the instrument whereby said impulses are directed outwardly against the wall of the well bore and are then reflected back to the instrument, receiving the reflected impulses at the same radial points from which said impulses were transmitted, taking measurements with respect to the instant of transmission of the transmitted impulses and the instant of reception of the received impulses at each station to determine the distance travelled by said impulses, and correlating all of the measurements taken to indicate the well bore diameter, irrespective of the position of the instrument with relation to the axis of the well bore, transposing the correlated measurements into a visible indication of the well bore diameter, continuously lowering the instrument through the well bore so as to traverse the area thereof to be calipered, and continuously generating and transmitting energy impulses and taking measurements thereof to provide a continuous determination of the well bore diameter during movement of the instrument through said well bore.

RALPH W. GOBLE.
GORDON JACKSON.

REFERENCES CITED

The following references are of record in the file of this patent:

UNITED STATES PATENTS

| Number | Name | Date |
|---|---|---|
| 2,121,411 | Schroder | June 21, 1938 |
| 2,151,878 | Weatherby | Mar. 28, 1939 |
| 2,156,052 | Cooper | Apr. 25, 1939 |
| 2,156,198 | Scherbatskoy | Apr. 25, 1939 |
| 2,156,624 | Faust | May 2, 1939 |
| 2,167,124 | Minton | July 25, 1939 |
| 2,184,313 | Owen | Dec. 26, 1939 |
| 2,191,121 | Slichter | Feb. 20, 1940 |
| 2,192,972 | Innes | Mar. 12, 1940 |
| 2,202,885 | Zuschlag | June 4, 1940 |
| 2,238,991 | Cloud | Apr. 22, 1941 |
| 2,251,817 | Athy et al. | Aug. 5, 1941 |
| 2,333,688 | Shepard | Nov. 9, 1943 |
| 2,408,458 | Turner | Oct. 1, 1946 |